United States Patent
Maekiniemi et al.

(10) Patent No.: US 7,035,673 B2
(45) Date of Patent: Apr. 25, 2006

(54) CALL HANDLING IN A COMMUNICATION NETWORK

(75) Inventors: Petri Maekiniemi, Würselen (DE); Hannu Vainiomäki, Kirkkonummi (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 490 days.

(21) Appl. No.: 10/276,614

(22) PCT Filed: Jun. 26, 2001

(86) PCT No.: PCT/EP01/07263

§ 371 (c)(1),
(2), (4) Date: Nov. 26, 2002

(87) PCT Pub. No.: WO02/01888

PCT Pub. Date: Jan. 3, 2002

(65) Prior Publication Data

US 2003/0138092 A1    Jul. 24, 2003

(30) Foreign Application Priority Data

Jun. 27, 2000    (EP)   .................................. 00113097

(51) Int. Cl.
*H04M 1/00*    (2006.01)

(52) U.S. Cl. ...................... 455/564; 455/461; 455/416; 455/435; 379/52

(58) Field of Classification Search ................ 455/440, 455/433

See application file for complete search history.

(56) References Cited

U.S. PATENT DOCUMENTS

| | | | | |
|---|---|---|---|---|
| 5,930,700 A | * | 7/1999 | Pepper et al. | ............. 455/435.3 |
| 6,018,737 A | * | 1/2000 | Shah et al. | .................... 707/10 |
| 6,351,646 B1 | * | 2/2002 | Jellema et al. | .............. 455/461 |
| 6,522,876 B1 | * | 2/2003 | Weiland et al. | .......... 455/414.1 |

FOREIGN PATENT DOCUMENTS

| | | |
|---|---|---|
| WO | WO 98/59504 | 12/1998 |
| WO | WO 99/23836 | 5/1999 |
| WO | WO 99/30512 | 6/1999 |

* cited by examiner

*Primary Examiner*—Lester G. Kincaid
*Assistant Examiner*—Fred A. Casca

(57) ABSTRACT

The invocation of an intelligent network service in a call handler for calls being routed to mobile stations in a mobile communication network is done in such a way that if a call being handled is a call to be routed to a mobile station, and if it is determined that at least one intelligent network identifier is activated for that mobile station a further comparison of a stored condition parameter of the mobile station with a current value of that mobile station's condition parameter is performed, and where the decision regarding the invocation of an intelligent network service depends on the outcome of such a comparison.

20 Claims, 3 Drawing Sheets

CALL HANDLING IN A COMMUNICATION NETWORK

BACKGROUND OF THE INVENTION

Intelligent Network (IN) services have become commonplace in modern telephone systems. Such IN services greatly enhance the functionality of telephone systems beyond the classical concept of simply connecting a call originating terminal with a call destination terminal. The "intelligence" of an intelligent network consists in the capability of identifying certain calls as associated with certain services, such as call forwarding, call queuing, call holding, etc. The basic concept of intelligent network services is well known in the art and need not be described further here.

One way of providing an IN technique that is flexible by not being fixedly bound to a telephone standard, is to provide a call handler that is arranged to receive network calls and apply routing information to such calls, where said call handler also checks if an IN service is to be invoked for a call, and if it is decided that an IN service is to be invoked, sending appropriate signals to an intelligent network service handler, which will then perform processing for providing the intelligent network service. Providing IN services is especially popular in mobile telephone systems, and since competition in the field of mobile telephony is hard, mobile telephone operators want to achieve a competitive advantage over other operators by offering their own services, which are not specified by standards. For mobile telephone systems, the known technique of Customized Applications for Mobile network Enhanced Logic (CAMEL) is one example of a standardized way of offering IN techniques for mobile networks. CAMEL is designed for use with GSM (Global System for Mobile Communication) or UMTS (Universal Mobile Telephone Standard).

FIG. 3 shows a basic arrangement of a call handling system according to CAMEL. A GSM network 30 contains a gateway mobile switching center (GMSC) 10. Network 30 could equally well be a UMTS network. Reference numeral 100 indicates a call provided to the GMSC 10, such that routing information can be applied to said call. In order to do this, the GMSC 10 interrogates the home location register (HLR) 11, which stores information that relates to call destination information contained in a call being routed. Namely, the home location register 11 contains information associated with a given subscriber, and a call being routed contains information relating to a given subscriber. Typically this will be the directory number assigned to said subscriber. The GMSC 10 will then request routing information associated with said directory number by sending an appropriate signal 101 to the HLR 11. In GSM such a signal is also referred to as a send routing information (SRI) MAP message. The HLR 11 then sends back appropriate routing information with a signal 102. This routing information can be a simple roaming number, i.e. a number which identifies the mobile switching center (MSC) presently serving the identified mobile subscriber. On the other hand, if an appropriate IN identifier is activated for the given subscriber, then the HLR 11 will provide IN invocation information to the GMSC 10.

If no IN invocation information is contained in signal 102, then the normal routing information (e.g. the roaming number) is applied to the call and this call is placed back into the network, which is indicated by arrow 107. It may be noted that full arrows represent content and signaling, while dotted arrows represent only signaling in FIG. 3.

If IN invocation information is passed to the GMSC 10, then the GMSC 10 routes the call to an entity call gsmSSF (gsm Service Switching Function) 20. In the example of FIG. 3, the GMSC 10 and gsmSSF 20 are contained in a node 200 of network 30. The gsmSSF 20 then requests information from the so-called gsmSCF (gsm Service Control Function) 21. The gsmSCF 21 instructs the gsmSSF on how to handle the call, and the appropriate IN service is executed. This is indicated by arrows 104 and 105. The gsmSSF 20 then carries out the instructions, which can e.g. consist in routing the call back to the GMSC, which in turn routes it back to the network, which is indicated by arrows 106 and 107. Naturally, this is only an example, as there is a multitude of IN services. In other words, it would also be possible that the gsmSSF 20 could hold the call while an outgoing call is started to a different subscriber, for arranging a meeting or conference.

A general problem with IN technology is the additional load in the network when all calls of IN subscribers have to be routed to the separate functional entity gsmSSF 20, and an additional procedure called IN triggering is required. IN triggering refers to the dialogue between the gsmSSF 20 and the gsmSCF 21. According to capacity calculations made with a default traffic model, an average load increase of IN invocation for a call can be quite considerable.

The second phase of the CAMEL standard (CAMEL ph2) addresses this problem by introducing a method referred to as conditional triggering. For originating calls, this method allows the gsmSSF 20 to check certain call conditions, such as dialed number, basic service code or type of call, before IN triggering. For terminating calls, this method allows the HLR 11 to check the basic service code before returning IN data to the GMSC 10. In other words, it is possible to make IN invocation dependent on the call type. An example of this could be that voice calls are forwarded, but fax calls are not.

Although conditional triggering reduces the network load, there is still a desire for greater load reduction. It may be noted that this desire not only exists in connection with the specific example shown in FIG. 3, but in connection with any system that employs a call handler (consisting of the GMSC 10 and HRL 11 in the example of FIG. 3) and an intelligent network service handler (consisting of the gsmSSF 20 and gsmSCF 21 in the example of FIG. 3), where the call handler is arranged to determine routing information and to perform an IN invocation under certain conditions.

OBJECT OF THE INVENTION

The object of the invention is to provide an improved call handler, improved call handling system and improved method of IN invocation in a call handler.

SUMMARY OF THE INVENTION

In accordance with the present invention, the decision routine in the call handler, which makes a decision if an intelligent network service is to be invoked, has the capability of not only checking if an intelligent network identifier is activated in the stored information relating to a given call destination, e.g. relating to a specific subscriber, but has an additional capability. This additional capability comes into play if a call being handled is a call to be routed to a mobile station, i.e. a mobile terminating call, and if an intelligent network identifier is activated in the stored information being used for call handling. Namely, the additional determination comprises a step of comparing a stored comparison value of a mobile station condition parameter associated with a corresponding condition of the mobile station to which the call being handled is to be routed, with a current value of the mobile station condition parameter, where the decision regarding the invocation of an intelligent network service depends on the outcome of the comparison.

In other words, the call handler is capable of making the decision regarding the invocation of an IN service dependent on a condition of the mobile station to which a call is to be routed. The condition of the mobile station used for the comparison can be an operating condition or a circumstantial condition (a condition relating to the circumstances of the mobile station). An example of an operating condition is the status of the mobile station, which can be described in terms of the on/off state, the busy state or by a certain operating mode. Examples of circumstantial conditions are the location or the time (dynamic data). The location can be identified by one or more of a plurality of indicators, such as a country indicator, a network indicator or a cell indicator. The time can be identified by a date indicator or a clock indicator. Therefore, in contrast to the prior art, which only provided the possibility of conditional triggering with respect to characteristics of the call being handled, the present invention proposes a conditional triggering based on one or more conditions of the mobile station to which a call is being routed. This provides numerous advantages. For example, there exist so-called prepaid subscribers, which means that the subscriber pays for his subscription in advance and the costs of using the network are progressively deducted from the prepaid amount, e.g. in the form of a descending register on a SIM (Subscriber Identity Module) card in the mobile station itself. According to the existing technology, all calls to such prepaid subscribers have to be routed to the intelligent network service handler (i.e. the gsmSSF in the case of GSM). This is a problem for such network operators who only wish to charge for the roaming call forwarding leg when roaming abroad, because they would like to avoid unnecessary IN triggering for calls to prepaid subscribers when these prepaid subscribers stay in their home PLMN (Public Land Mobile Network). In accordance with the present invention, this problem can be solved by implementing the invention such that the condition of the mobile station for which a comparison is conducted, is the location. More specifically, in the above-mentioned example the condition parameter for which the comparison can be made can be the network identifier stored together with the subscriber information in the register storing subscriber information, such as the HLR in the case of GSM. Assuming that about 90% of calls to prepaid subscribers are received when these subscribers are in their home PLMN, this means that a load reduction of 90% of additional load caused by IN invocation with respect to such prepaid subscribers can be achieved with respect to the known technology. Another example where the present invention can be applied advantageously, is in the case of an IN service where the call destination is changed based on called subscriber status, such as busy or not reachable, and on the status idle, the call would always be routed normally. In the current technology, all calls of subscribers with such a service must be routed to the intelligent network service handler. By applying the present invention, it is possible to only invoke the IN service when this service is indeed necessary, e.g. when the mobile station is busy or not reachable. If the mobile station is idle, then the call is routed normally, without IN invocation. Due to the fact that on average the typical mobile terminal will be idle most of the time, such an implementation of the present invention again reduces the load due to IN invocation considerably.

BRIEF DESCRIPTION OF DRAWINGS

The present invention shall be explained in more detail in connection with preferred embodiments, which make reference to the appended drawings, in which.

DETAILED DESCRIPTION OF PREFERRED EMBODIMENTS

Figure 2:
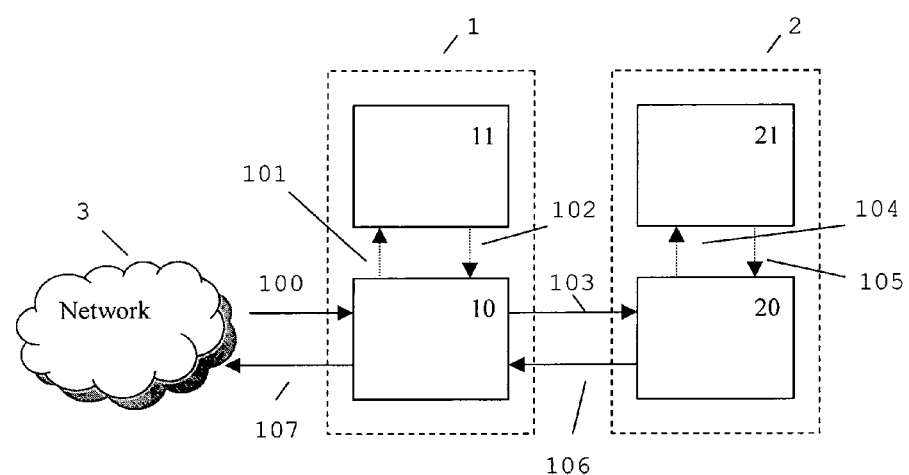
FIG. 2 shows a block diagram representing a preferred embodiment of the call handling system of the present invention.

FIG. 2 shows a preferred embodiment of a call handling system according to the present invention. A call handler 1 receives calls 100 and determines routing information for these calls. Reference numeral 3 represents a mobile communication network. The call handler 1 is for example a part of the network 3. On the other hand, an intelligent network service handler 2 is provided, which deals with such calls for which the call handler 1 invokes an intelligent network service.

Preferably, the call handler consists of two parts, a first part 10 for receiving calls into the mobile network and forwarding calls in the network, according to the routing information, after the routing information has been applied to the calls. A second part 11 is a register or memory containing routing information and routines capable of associating destination or subscriber information extracted from a call with the appropriate routing information. The first part 10 signals call related information to the second part 11 (see arrow 101), and the second part 11 then instructs the first part 10 on the basis of the found routing information (arrow 102).

The call handler 1 additionally determines if an intelligent network service is to be invoked for a given call. This is done by checking if an intelligent network identifier is activated for a call being routed. For example, the subscriber information which is interrogated when determining the routing information can also contain predetermined data that indicates that the subscriber subscribes to an intelligent network service and can identify which service this is. If the processing in call handler 1 decides that an IN service is to be invoked, an appropriate action is taken in direction of IN service handler 2. In the example of FIG. 2 it is shown that the call is forwarded to the IN service handler 2 (arrow 103). It may be noted that similar to FIG. 3, a full arrow in FIG. 2 represents a call (content and signaling), while a dotted arrow represents only signaling. Regarding the example of FIG. 2, this means that if an IN service is to be invoked, then call handler 1 adds appropriate information to the call and forwards the call to IN service handler 2, where further processing occurs. However, it may be noted that it is also possible that the call handler 1 holds the call and only establishes a signaling connection with IN service handler 2, where information relating to the IN service invoked is communicated to the IN service handler, which in turn responds by sending back appropriate routing and control information.

Returning to the example of FIG. 2, the IN service handler 2 receives the forwarded call 103 and then conducts appropriate processing that depends on the IN invocation information added to the call. If the result of the processing is a routing, the appropriately modified call is sent back to the call handler 1 (arrow 106), which then forwards the call back into the network 3.

IN service handler 2 preferably also consists of two parts, namely a first part 20 that receives the calls 103 from the call handler 1, and a second part 21 that performs the processing for determining the appropriate control information.

The IN service handler 2 can be part of the mobile communication network 3, or can be separate therefrom.

It may be noted that the depicted parts 10, 11, 20 and 21 are functional entities, which means that may be provided in one physical unit, but they can equally well be spread out over a plurality of physical units.

Figure 3:
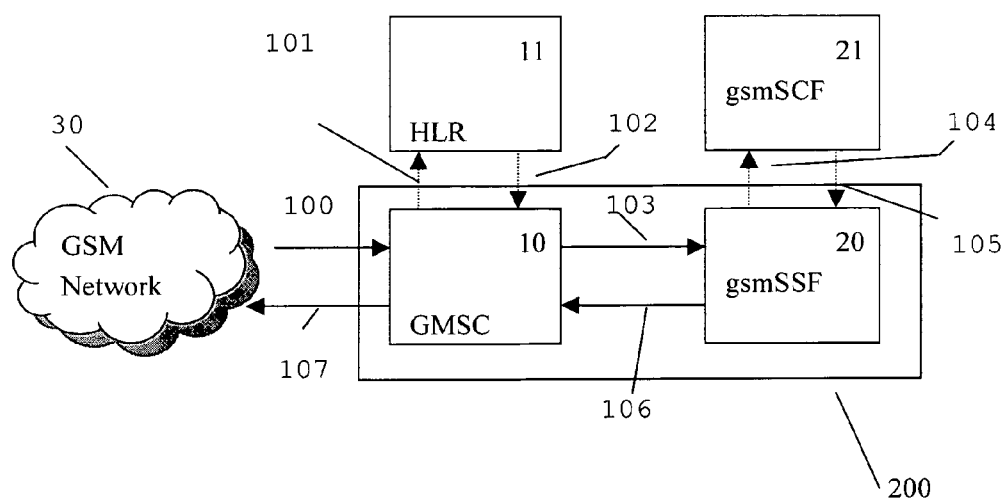
FIG. 3 shows a block diagram representing a call handling system according to GSM, to which the present invention can be applied.

Preferably the call handling system is arranged as shown in FIG. 3, namely as a system designed for GSM. FIG. 3 has already been described, and the same reference numerals as in FIG. 2 refer to corresponding elements, such that a repeated description is not necessary. However, it may be noted that the present invention naturally is applicable to any appropriate network system and any appropriate IN scheme. In other words, it is not restricted to GSM and CAMEL. For example, the network 3 could also conform to UMTS, and the IN invocation can then occur in any suitable corresponding fashion. Element 20 will then generally be referred to as a Service Switching Function (SSF) and element 21 as a Service Control Function (SCF).

Figure 1:
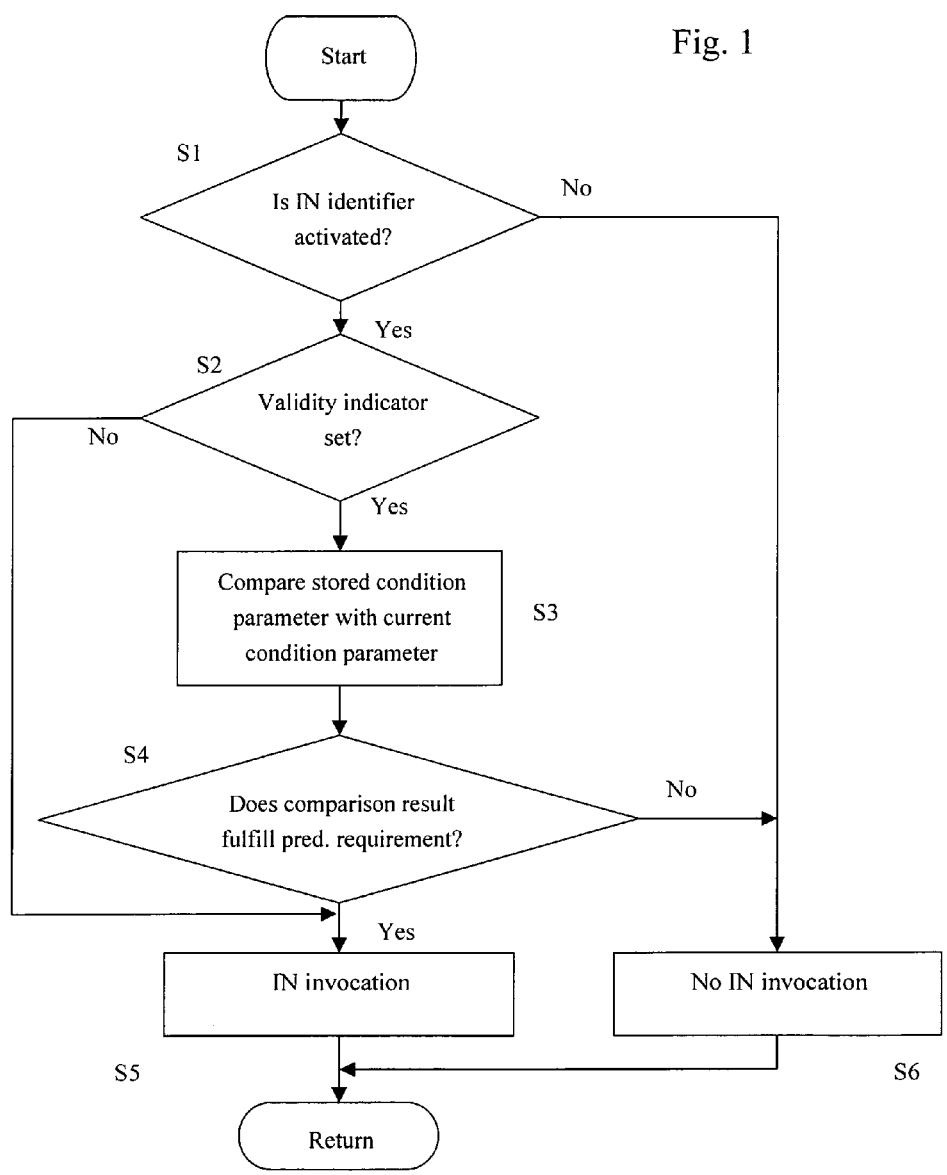
FIG. 1 shows a flow chart explaining a basic embodiment of the method of the present invention.

Now the basic concept of the present invention shall be described by way of the example shown in FIG. 1. FIG. 1 shows a processing routine in the call handler 2, which determines if an intelligent network service is to be invoked or not if a call being routed is a mobile terminating call, i.e. the routing processing has determined that the destination of the call is a mobile station. In other words, the processing in the call handler jumps to this routine when the stage of processing is reached at which it is determined if an IN invocation is to take place or not for such mobile terminating calls.

In a first step S1, it is determined if an intelligent network identifier is activated for the destination or subscriber under consideration. Namely, as already described previously, the first part 10 (GMSC 10) will have signaled an appropriate destination or subscriber indication (e.g. a directory number) to the second part 11, which preferably handles the processing shown in FIG. 1. If step S1 determines that no IN identifier is activated, then the procedure branches to step S6, which means that no IN invocation takes place. The processing then returns to the main processing routine, which will continue without IN invocation.

On the other hand, if step S1 finds an activated IN identifier, step S2 is processed. S2 determines if a validity indicator is set for the activated IN identifier. The validity indicator can be a single bit or flag, which has the simple purpose of allowing the processing of steps S3 and S4 to be turned on or off in a very simple way. Namely, by adding the feature of the validity indicator it is not necessary to deactivate an IN identifier if it is desired to avoid the processing of steps S3 and S4. It is naturally simpler to enable or disenable the specific function of condition comparison by setting a single validity bit or flag, than to perform activation or deactivation routine for an IN identifier. However, it should be noted that step S2 is preferable but not necessary.

If the validity indicator is set in step S2, step S3 is processed, where a stored condition parameter is compared with a current condition parameter. As already mentioned previously, the condition to which the parameter relates can be an operating condition or a circumstantial condition. The operating condition can e.g. be the status of the mobile station, in which case the related parameter can be an on/off indicator, a busy indicator or more generally an operating mode indicator. While the on/off indicator simply provides information whether the mobile station is switched on or off, and the busy indicator simply provides information whether the mobile station is busy, an operating mode indicator would have a plurality of states, where each state corresponds to an operating mode.

As an example, it is possible that the mobile station could be run in three different modes, where a first mode is simply a paging mode, the second mode a telephone mode, and a third mode a multimedia mode. Namely, in the first mode the mobile station would only work as a pager, in the second mode as a regular telephone, and in the third mode as a full multimedia terminal. Naturally, other mode hierarchies are possible, and this is only an example.

The condition relating to the condition parameter compared in step S3 could also be a circumstantial condition. Such a circumstantial condition could be the location. The condition parameter associated with the location can e.g. be a country indicator, a network indicator or a cell indicator (in the case of a cellular network). Naturally, any other parameter indicative of the location could be used.

The circumstantial condition could also be the time relating to the mobile station, i.e. the local time of the mobile station or a global time, such as Greenwich Mean Time. If the time is the condition, then a corresponding parameter could be a date indicator or a clock indicator.

Subsequent to step S3, step S4 determines if the comparison of step S3 has resulted in a predetermined requirement being met. The predetermined requirement can be formulated positively (e.g. stored condition parameter=current condition parameter) or negatively (stored condition parameter≠current condition parameter). If the predetermined condition is met, then an IN service is invoked (step S5), and if not, then no IN service is invoked (step S6). Thereafter, the determination routine returns to the main processing routine.

The condition for which a comparison is conducted will typically depend on the IN service activated. Equally, the specific parameter (or parameters) compared will also be chosen in conjunction with the specific IN service. Due to the large number of very diverse IN services, a great number of possibilities exist. Equally, the predetermined requirement checked in step S4 will depend on the IN service activated, on the chosen condition and the chosen parameter (s). Again, a large number of possibilities exist.

For example, if the IN service is a call forwarding service to a mailbox, it is possible that this service is only invoked during certain times of day (e.g. from 8 p.m. to 8 a.m.), or only on workdays. Equally, it is possible that such a call forwarding service is only invoked if the subscriber is not within the cell belonging to his private home. In other words, the condition is the location, and the condition parameter is the cell identifier. The stored condition parameter would be the cell identifier belonging to the private home of the subscriber, and the predetermined requirement in step S4 would be that the current condition parameter is not equal to the stored condition parameter. Another example involving the location as a condition is the above-mentioned charging of the roaming call forwarding leg for prepaid subscribers, where the corresponding condition parameter would be the network identifier.

A different example, which involves the operating condition would be using a busy indicator as a condition parameter, where the call forwarding function would only be invoked if the busy indicator shows the mobile station to be busy.

Although the routine shown in FIG. 1 is a preferred example, a large number of variations and modifications are possible. For one thing, FIG. 1 only shows a basic routine exemplifying the invention, and other additional steps could be implemented in the procedure for determining if an intelligent network invocation is to be performed or not. For example, the known conditional triggering function of CAMEL ph2 is preferably also implemented.

Moreover, although step S1 only mentions one activated IN identifier, it is naturally also possible to determine if a number of IN identifiers are activated, where the routine shown by steps S2 to S4 could then be conducted for each activated IN identifier individually.

Also, although step S3 only indicates comparing one stored condition parameter with a current condition parameter, it is naturally possible to compare the current parameter with a plurality of stored parameters, e.g. to determine if the current condition parameter lies in a specific range. Moreover, it is possible to compare a plurality of condition parameters that belong to a given condition. For example, in the event of the location being the condition, it is possible to make a decision based on the network identifier and the cell identifier, or in the case that the time is the condition, it is possible to make a decision based on the time of day and the date.

Furthermore, it is clear that the predetermined condition checked in step S4 depends on the specific one or more conditions and one or more condition parameters, such that a wide variety of requirements can be implemented, depending on the specific desired effect.

Regarding the above-described basic routine and its various modifications, it is clear that the call handler 1 must store the appropriate current condition parameter(s). In mobile communication systems, it is already known to store certain current condition parameters in association with subscriber information, e.g. the location and status. The updating procedures for such parameters are well known and therefore need not be described further here. If the comparison step S3 requires new forms of condition parameters (e.g. the local time of the mobile station) to be stored, then analogous updating routines can be implemented for keeping the data in the call handler (e.g. in the HLR in the case of GSM) up to date.

As already mentioned above, the above-described routine of FIG. 1 or one of its many variations is implemented in the call handler 1. It is preferably implemented such that unnecessary signaling and call handling is avoided to the maximum, which means that the routine should be implemented in the register or memory where the subscriber information (information used for determining routing information on the basis of call destination information) is contained, i.e. in the second part 11, which means in the HLR 11 in the case of the GSM system shown in FIG. 3. Naturally, it is also possible to implement the routine or one of its modifications in the first part 10 (the GMSC 10 in the case of GSM), but this can lead to unnecessary signaling between the first part 10 and the second part 11.

Although the present invention has been described by way of specific embodiments, it is not intended to restrict the invention to these embodiments, as the scope of the invention is defined by the appended claims. Also, reference numerals in the claims serve to make the claims easier to read, but do not restrict the scope.

The invention is:

1. A method of controlling the invocation of an intelligent network service in a mobile telecommunications network, wherein said mobile telecommunications network includes a call handler for processing a call connection request to and from a mobile station wherein said call connection request includes call destination information and wherein said call handler is operable to determine routing information for said call connection request by interrogating a database associated with said call handler and an intelligent network service handler for processing interrogations requested by said call handler, wherein said database stores an intelligent network (IN) identifier indicating whether said mobile station has IN service activated, comprising the steps of:

storing a condition parameter for a destination mobile station identified by said call destination information;

checking by said call handler if said intelligent network identifier is activated in the database for a particular call connection request;

determining by said call handler, in response to said intelligent network identifier being activated, a particular condition of said call destination mobile station, said step further comprising;

comparing said determined condition with said stored condition parameter by said call handler; and in response to said comparison being satisfied, invoking a particular IN service by transmitting a signal from said call handler to said intelligent network service handler; otherwise, routing said call connection request without communicating with said intelligent network service handler and not invoking an IN service; otherwise routing said call connection request, in response to said intelligent network identifier not being activated, without communicating with said intelligent network service handler and not invoking an IN service.

2. The method of claim 1 wherein said stored condition parameter is an operating condition.

3. The method of claim 2 wherein said operation condition includes the operating status of said destination mobile station wherein said operation status further includes on/off status and busy/idle status.

4. The method of claim 1 wherein said stored condition parameter is a circumstantial condition.

5. The method of claim 4 wherein said circumstantial condition is the location of said destination mobile station.

6. The method of claim 5 wherein said location is a cell indicator.

7. The method of claim 5 wherein said location is a network indicator.

8. The method of claim 4 wherein said circumstantial condition is the current time associated with said destination mobile station.

9. The method of claim 1 wherein said call handler includes a mobile switching center (MSC) and said database includes a home location register (HLR) storing said routing information.

10. The method of claim 9 wherein said intelligent network service handler includes a service switching function and a service control function.

11. A call handler for controlling the invocation of an intelligent network service in a mobile telecommunications network and for processing a call connection request to and from a mobile station wherein said call connection request includes call destination information and wherein said call handler is operable to determine routing information for said call connection request by interrogating a database associated with said call handler and wherein said interrogation is received and processed by an intelligent network service handler, wherein said database stores intelligent network (IN) identifier indicating whether said mobile station has IN service activated, comprising:

means for storing a condition parameter for a destination mobile station identified by said call destination information;

means for checking if one or more intelligent network identifiers are activated in the database for a particular call connection request;

in response to an affirmative determination that said one or more intelligent network identifiers are activated for said call connection request:

means for determining, in response to said intelligent network identifier being activated, a particular condition of said destination mobile station;

means for comparing said determined condition with said stored condition parameter; and in response to said comparison being satisfied, means for invoking a particular IN service by transmitting a signal to said intelligent network service handler; otherwise, means for routing said call connection request without communicating with said intelligent network service handler and not invoking an IN service; otherwise, in response to a negative determination that said one or more intelligent network identifiers are not activated for said call connection request:

means for muting said call connection request without communicating with said intelligent network service handler and not invoking an IN service.

12. The call handler of claim 11 wherein said stored condition parameter is an operating condition.

13. The call handler claim 12 wherein said operation condition includes the operating status of said destination mobile station wherein said operation status further includes on/off status and busy/idle status.

14. The call handler of claim 11 wherein said stored condition parameter is a circumstantial condition.

15. The call handler of claim 14 wherein said circumstantial condition is the location of said destination mobile station.

16. The call handler of claim 15 wherein said location is a cell indicator.

17. The call handler of claim 15 wherein said location is a network indicator.

18. The call handler of claim 14 wherein said circumstantial condition is the current time associated with said destination mobile station.

19. The call handler of claim 11 comprises a mobile switching center (MSC) for receiving said call connection request and a home location register (HLR) for storing said routing information.

20. The call handler of claim 19 wherein said intelligent network service handler includes a service switching function and a service control function.

\* \* \* \* \*

UNITED STATES PATENT AND TRADEMARK OFFICE
CERTIFICATE OF CORRECTION

| | | |
|---|---|---|
| PATENT NO. | : 7,035,673 B2 | Page 1 of 1 |
| APPLICATION NO. | : 10/276614 | |
| DATED | : April 25, 2006 | |
| INVENTOR(S) | : Maekiniemi et al. | |

It is certified that error appears in the above-identified patent and that said Letters Patent is hereby corrected as shown below:

In Column 10, Line 1, in Claim 11, delete "muting" and insert -- routing --, therefor.

Signed and Sealed this

Twenty-seventh Day of November, 2007

JON W. DUDAS
*Director of the United States Patent and Trademark Office*